(12) United States Patent
Tseng et al.

(10) Patent No.: US 7,447,262 B2
(45) Date of Patent: Nov. 4, 2008

(54) ADAPTIVE BLIND START-UP RECEIVER ARCHITECTURE WITH FRACTIONAL BAUD RATE SAMPLING FOR FULL-DUPLEX MULTI-LEVEL PAM SYSTEMS

(75) Inventors: Ching-Yih Tseng, Hsin Chu (TW); Ming-Chou Yen, Hsin Chu (TW); Jui-Tai Ko, Hsin Chu (TW); Kun-Ying Tsai, Hsin Chu (TW)

(73) Assignee: RDC Semiconductor Co., Ltd. (TW)

( * ) Notice: Subject to any disclaimer, the term of this patent is extended or adjusted under 35 U.S.C. 154(b) by 618 days.

(21) Appl. No.: 11/128,938

(22) Filed: May 12, 2005

(65) Prior Publication Data
US 2006/0256849 A1 Nov. 16, 2006

(51) Int. Cl.
*H03K 5/159* (2006.01)
(52) U.S. Cl. ............... 375/232; 375/233; 375/326; 375/344; 375/346
(58) Field of Classification Search ............... 375/316, 375/229–234, 355
See application file for complete search history.

(56) References Cited

U.S. PATENT DOCUMENTS

| | | | | |
|---|---|---|---|---|
| 3,440,548 A | * | 4/1969 | Saltzberg | 327/94 |
| 4,004,226 A | * | 1/1977 | Qureshi et al. | 375/231 |
| 4,344,176 A | * | 8/1982 | Qureshi | 375/235 |
| 4,989,221 A | * | 1/1991 | Qureshi et al. | 375/222 |
| 5,020,078 A | * | 5/1991 | Crespo | 375/233 |
| 5,228,060 A | * | 7/1993 | Uchiyama | 375/316 |
| 6,295,325 B1 | * | 9/2001 | Farrow et al. | 375/327 |
| 6,414,990 B1 | * | 7/2002 | Jonsson et al. | 375/232 |
| 6,707,868 B1 | * | 3/2004 | Camagna et al. | 375/371 |
| 6,891,910 B2 | * | 5/2005 | Hwang et al. | 375/355 |
| 6,985,549 B1 | * | 1/2006 | Biracree et al. | 375/355 |
| 7,054,088 B2 | * | 5/2006 | Yamazaki et al. | 360/65 |
| 7,106,818 B2 | * | 9/2006 | Balakrishnan et al. | 375/355 |
| 7,110,448 B2 | * | 9/2006 | Bergmans et al. | 375/233 |
| 7,145,945 B2 | * | 12/2006 | Modrie et al. | 375/233 |
| 7,184,504 B2 | * | 2/2007 | Menkhoff | 375/355 |

* cited by examiner

*Primary Examiner*—Mohammad Ghayour
*Assistant Examiner*—Sophia Vlahos
(74) *Attorney, Agent, or Firm*—Peter F. Corless; Steven M. Jensen; Edwards Angell Palmer & Dodge LLP (57) ABSTRACT

This invention presents a novel receiver architecture for full-duplex multi-level PAM systems. The receiver employs an Analog-to-Digital Converter (ADC) that has a sample rate flexibly specified as $(N_s+1)/N_s$ baud rate where $N_s$ is an integer equal or greater than 1. A fractional-spaced echo canceller is used to cancel the echo at the ADC output. The use of a fractional sampling rate higher than the baud rate also enables the timing recovery function be implemented in the digital domain and hence eliminates the need of using the complex analog phase selection circuit. The receiver is also capable of fast, blind start-up by use of a decision feedback equalizer with unity main tap and a soft level slicer. The timing phase can be optimally located using a derivative channel estimator. Once the "eye-open" condition is achieved, the channel equalization is switched to the use of linear equalizer coupled with an error feedback equalizer to alleviate the error propagation problem associated with the decision feedback equalizer.

15 Claims, 12 Drawing Sheets

ADAPTIVE BLIND START-UP RECEIVER ARCHITECTURE WITH FRACTIONAL BAUD RATE SAMPLING FOR FULL-DUPLEX MULTI-LEVEL PAM SYSTEMS

FIELD OF THE INVENTION

The present invention relates to an apparatus and method for demodulating a full-duplex multi-level PAM system, more particularly, an apparatus and method for demodulating a full-duplex multi-level PAM system applicable in a full-duplex Gigabit Ethernet transceiver.

BACKGROUND OF THE INVENTION

Various receiver architectures for a full-duplex multi-level PAM (Pulse Amplitude Modulation) with applications in Gigabit Ethernet transceiver implementation have been proposed in, for example, an U.S. patent entitled "Multi-Pair Gigabit Ethernet Transceiver" by Agazzi et al. (U.S. Pat. No. 6,771,752), an U.S. patent entitled "Symbol Encoding and Decoding Architecture for Trellis-Coded Modulation in Gigabit Ethernet" by Bhoja (U.S. Pat. No. 6,731,692) and a publication entitled "The IntelliRate Architecture" by Agere Systems in 2003. All of these architectures employ a sample rate that equals exactly the baud-rate ($f_b$) or twice the baud-rate ($2f_b$). The use of baud rate sampling requires that the receiving signal be sampled at the optimum timing phase location at the Analog-to-Digital Converter (ADC) output, and thus requires complex phase selection circuit in the analog domain. As pointed out in the above paper titled "The IntelliRate Architecture", the analog phase selection circuit can be removed by doubling the speed of the ADC and by using a digital equalizer to compensate for both the timing phase misalignment and channel distortion. Although removing the phase selection circuit reduces the analog circuit complexity, the use of a double speed ADC inevitably increases the ADC complexity. For example, the baud rate of Gigabit Ethernet is 125 MHz and the realization of a 250 MHz ADC with high bit resolution is very demanding. Thus, there is a need for receiver architecture with flexible sampling rate that eliminates the use of a complex analog phase selection circuit without doubling the speed of the ADC.

Moreover, for a full-duplex PAM system, a portion of the transmitting signal echoes back from the hybrid circuit to the receiver front-end. This echo must be cancelled before the receiving signal can be demodulated, such problem is addressed for example in a paper called ""An Echo Cancellation Based 4800 Bit/s Full-Duplex DDD Modem" by Werner, J.-J. in IEEE Journal on Selected Areas in Communications in 1984. For the conventional baud rate receiver structure, such as the one disclosed in the above paper, a baud-rate digital echo canceller is used to cancel the echo after the ADC. This can be replaced by a fractional baud rate digital echo canceller for the underlining receiver architecture. The fractional baud-rate echo canceller has the capability of removing out-of-band noise coupled with the echo and thus offers better noise rejection performance over the baud-rate echo canceller After the echo is cancelled, the receiving signal must be sampled at the correct timing phase before channel equalization can be performed in order to obtain optimum signal-to-noise performance at the equalizer output. At the start-up stage of the receiver, the receiver is totally "blind" in that it does not sample the signal at the correct timing neither does it have the correct equalizer coefficients to equalize the channel distortion. Conventional approach uses a decision feedback equalizer (DFE) with a soft level slicer to effectively achieve a "blind" start-up, but such construction possesses the error propagation problem as a result of decision error when the receiver operates under more severe noise environment. Prior work has been proposed to reduce this error effect by combing the DFE with a Viterbi decoder, such as in a paper by Erich F. Haratsch, titled ""A 1-Gb/s Joint Equalizer and Trellis Decoder for 1000BASE-T Gigabit Ethernet" of IEEE Journal of Solid-State Circuits in 2001 and in the two previously mentioned U.S. patents (U.S. Pat. Nos. 6,771,752 and 6,731,692). However, this implementation of combining the DFE with a Viterbi decoder is nonetheless complex. Thus, there is a further need for a fast "blind" start-up equalization in a receiver while at the same time addressing the error propagation problem associated with the traditional DFE.

SUMMARY OF THE INVENTION

This invention presents a receiver structure that employs an ADC with $(N_s+1)/N_s \cdot f_b$ rate to sample the analog receive signal plus echo at a receiving end of a hybrid circuit. An $(N_s+1)/N_s$ fractional-spaced digital echo canceller is used to cancel the echo at the ADC output. The echo canceller is driven by local transmit symbols from a transmitter operating at the baud rate sampling clock. The coefficients of the echo canceller are adaptively adjusted to minimize the echo residual using a Least-Mean-Square (LMS) adaptive algorithm.

After the echo is removed from the receiving signal, a digital resampler is used to adjust the timing phase to maximize the signal-to-noise ratio at the equalizer output where the optimum timing phase is iteratively computed from a timing recovery phase-locked (PLL) feedback loop. By properly scaling the phase in the timing recovery PLL feedback loop, the digital resampler also effectively converts the sample rate from $(N_s+1)/N_s \cdot f_b$ to $f_b$ so that the channel equalization can be operated under baud rate. The use of baud rate equalizer is simpler and its performance is close to a more complicated fractional-spaced equalizer provided that the optimal timing phase can be recovered from the timing recovery PLL feedback loop. Since both the timing recovery PLL loop and the resampler are implemented digitally, the baud rate samples can be regenerated accurately with the optimum timing phase and hence the baud-rate equalizer performance can be guaranteed. The digital resampler comprises a FIR polynomial structure that is capable of computing corresponding derivate sample with the same timing simultaneously. The derivative sample sequence contains timing information that can be effectively extracted by use of a derivative channel estimator that linearly combines a slicer output to approximate the sequence in a Least-Mean-Square sense. Timing phase error is then derived from the derivative channel estimator coefficients where zero timing error is defined statistically when the first order derivative of the channel response at a main cursor location is driven to zero. This timing phase error is fed to the timing recovery PLL circuit to generate an estimate of the optimum timing phase location. The timing recovery PLL loop is closed by feeding back the new timing phase estimate to the digital resampler so that the baud rate sample and derivative sample associated with this new timing phase are generated for use in the equalization and derivative channel estimator, respectively, in the next iteration.

The channel equalization for this receiver operates in two modes. The first mode, referred to as the Start-Up Blind Equalization (BEQ), uses a decision feedback equalizer with a soft level slicer to ensure fast "blind" start-up. The convergence of the decision feedback equalizer and the derivative channel estimator depends heavily on the probability of correct decision at the slicer output. The fast "blind" start-up can be achieved by use of a unity weighing coefficient for the main cursor tap and a soft level slicer that employs the a priori information about the probability of each level of PAM being transmitted at the remote transmitter end. This probability information is used to adaptively adjust the decision boundary of the soft level slicer to ensure that the probability of correct decision is maintained at an acceptable level. With the 3-level PAM being used in the training mode of the Gigabit Ethernet, consistent fast "blind" start-up are observed for both short and long cable lengths. To alleviate the error propagation problem associated with the DFE, the channel equalization switches to the second mode, referred to as the Linear Equalization After Eye-Open (LEQ), which employs a linear equalizer (LEQ) cascaded with an error feedback equalizer (EFE). Once the convergence of the DFE and the timing loop is observed, the LEQ branch becomes active and both the LEQ and EFE coefficients are trained. At the beginning of this training, the hard level slicer in the LEQ branch will not generate correct decision at an acceptable probability. As such, the BEQ branch will remain active and the soft level slicer output is used to compute the slicer error for the LEQ branch to update the equalizer coefficients. Once the hard level slicer output is detected to generate correct decision at an acceptable probability, the BEQ branch can cease operation and the LEQ branch will enter the decision-directed operation that uses the hard level slicer output to compute the slicer error. The role of the EFE is to compensate for the noise enhancement generated by the linear equalizer. Although an incorrect slicer decision will also affect the performance of the EFE, this error propagation problem is much lessened compared to the DFE approach in that the length of the EFE is generally short and a hard limiter can be employed to limit the slicer error before feeding to the EFE.

DETAILED DESCRIPTION OF THE PREFFERED EMBODIMENT

Figure 1:
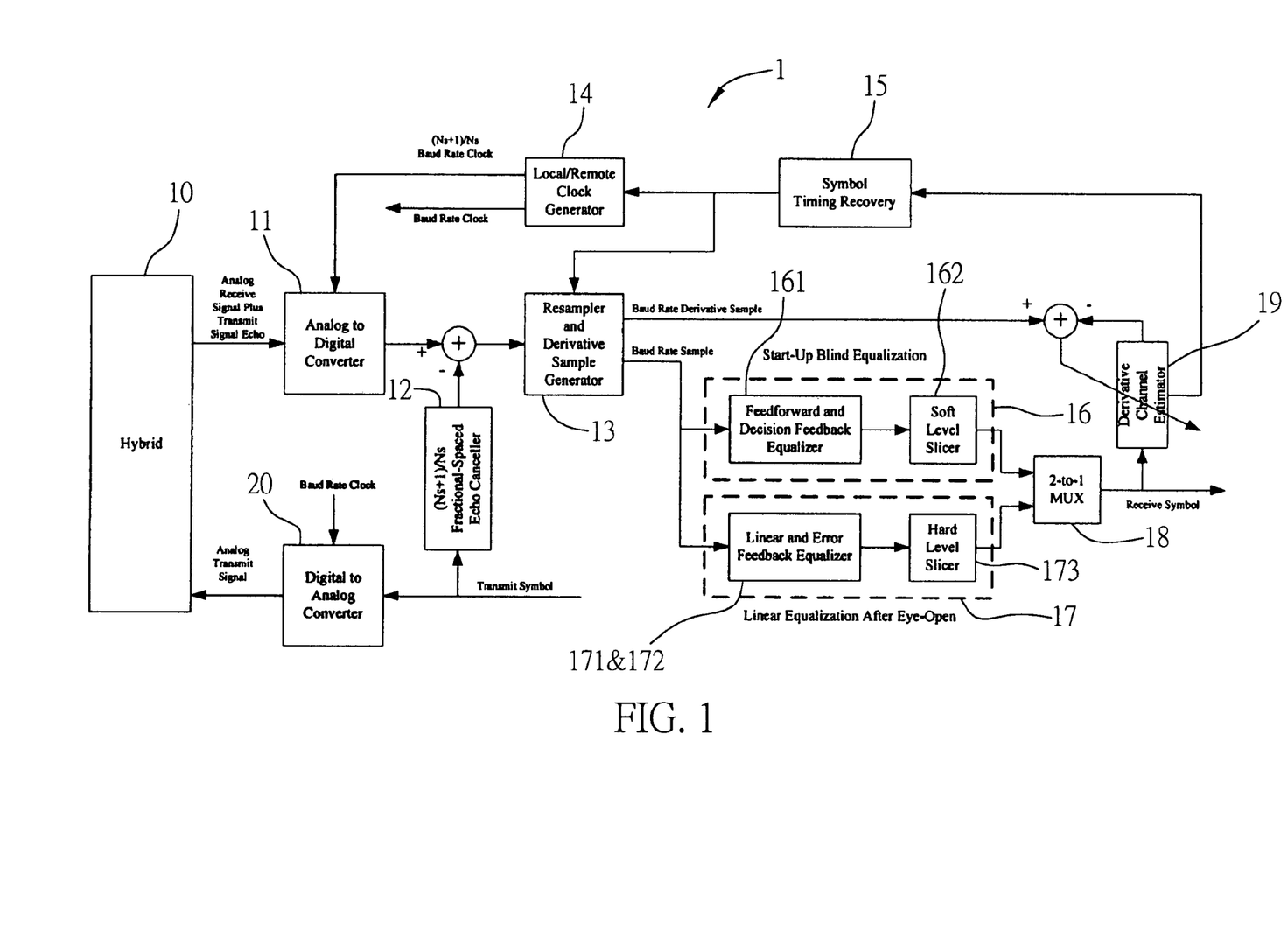
FIG. 1 illustrates a block diagram of the receiving architecture of a Gigabit Ethernet transceiver according to one embodiment of the present invention.

As shown in FIG. 1, a receiver structure 1 of the present invention comprises a Hybrid 10, an Analog-to-Digital Converter (ADC) 11, a fractional-spaced echo canceller 12, a digital resampler 13, a local/remote clock generator 14, a timing recovery PLL circuit 15, a blind equalization (BEQ) branch 16, a linear equalization (LEQ) branch 17, a 2-to-1 Multiplexer (Mux) 18 and a derivative channel estimator 19.

The BEQ branch 16 comprises a decision feedback equalizer 161 and soft level slicer 162, whereas the LEQ branch 17 comprises a linear equalizer 171, an error feedback equalizer 172, a hard level slicer 173 and an error level hard limiter 174. Both of these branches will be described in details later.

The sample rate of the ADC 11 is flexibly specified as $(N_s+1)/N_s$ times the baud rate, where $N_s$ is an integer greater than or equal to one. Thus, the sample rate equals 2× baud rate when $N_s$ is selected as 1, while it equals baud rate as $N_s$ goes to positive infinite. By choosing $N_s$ in the range of $(1, \infty)$, the architecture employs a fractional baud rate sampling that is between $f_b$ and $2f_b$. The over-sampling factor offered by the use of a fractional baud rate allows the timing phase selection being performed in the digital domain, thus removing the analog phase selection circuit without the need of doubling the speed of the ADC. With the flexibility of specifying $N_s$ as a parameter, a suitable ADC speed falling between the baud rate and twice the baud rate can be specified to achieve the best design trade-off to reduce the analog circuit complexity. For example, if $N_s$ is selected as 5 the ADC speed requirement for the presented architecture is 150 MHz for the Gigabit Ethernet, which is significantly lower than the 250 MHz required in the receiver with $2f_b$ sampling rate while having the benefit of not requiring a complex analog phase selection circuit.

Figure 10:
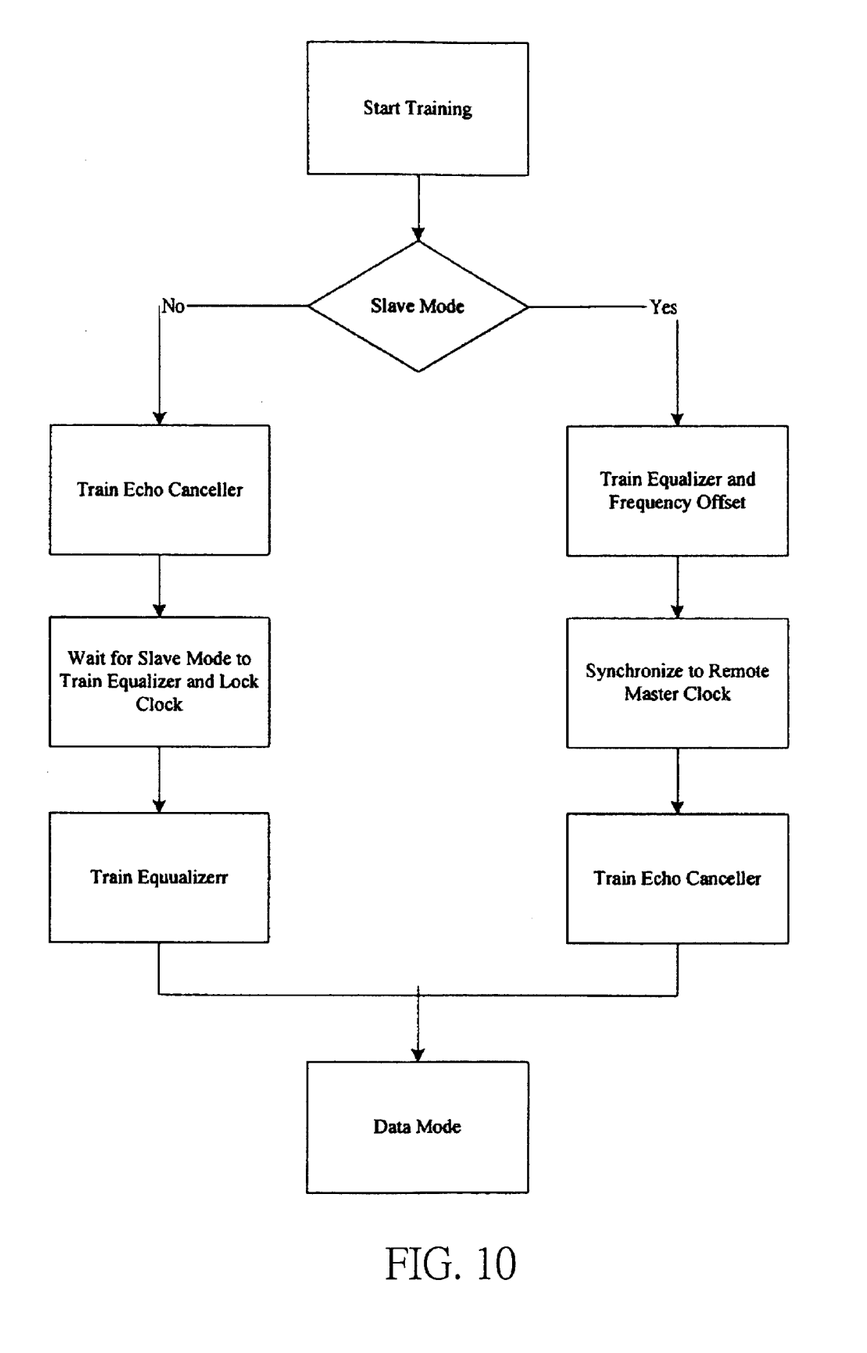
FIG. 10 shows a typical training order for both the master and slave modes.

As in the Gigabit Ethernet, the transceiver distinguishes itself as the master or slave modes. For a master mode transceiver, its local clock is used as the timing reference for the full-duplex system. The slave mode transceiver has to use this timing reference to transmit and receive symbols. Due to this distinction, the training sequence for the master and slave modes differs in the order of which the echo canceller, equalizer and timing recovery are trained as shown in FIG. 10. The full-duplex system initially operates in a half-duplex mode where only the master is sending and the slave keeps silent. The master trains its echo canceller at this half-duplex mode while the slave trains its equalizer and timing synchronization. Once the master converges its echo canceller and the slave converges its equalizer and timing synchronization, the slave starts to send signal. The master then starts its equalizer and timing training while the slave trains its echo canceller. As shown in FIG. 10, both master and slave then enter full-duplex data mode after both sides complete the training.

Figure 2:
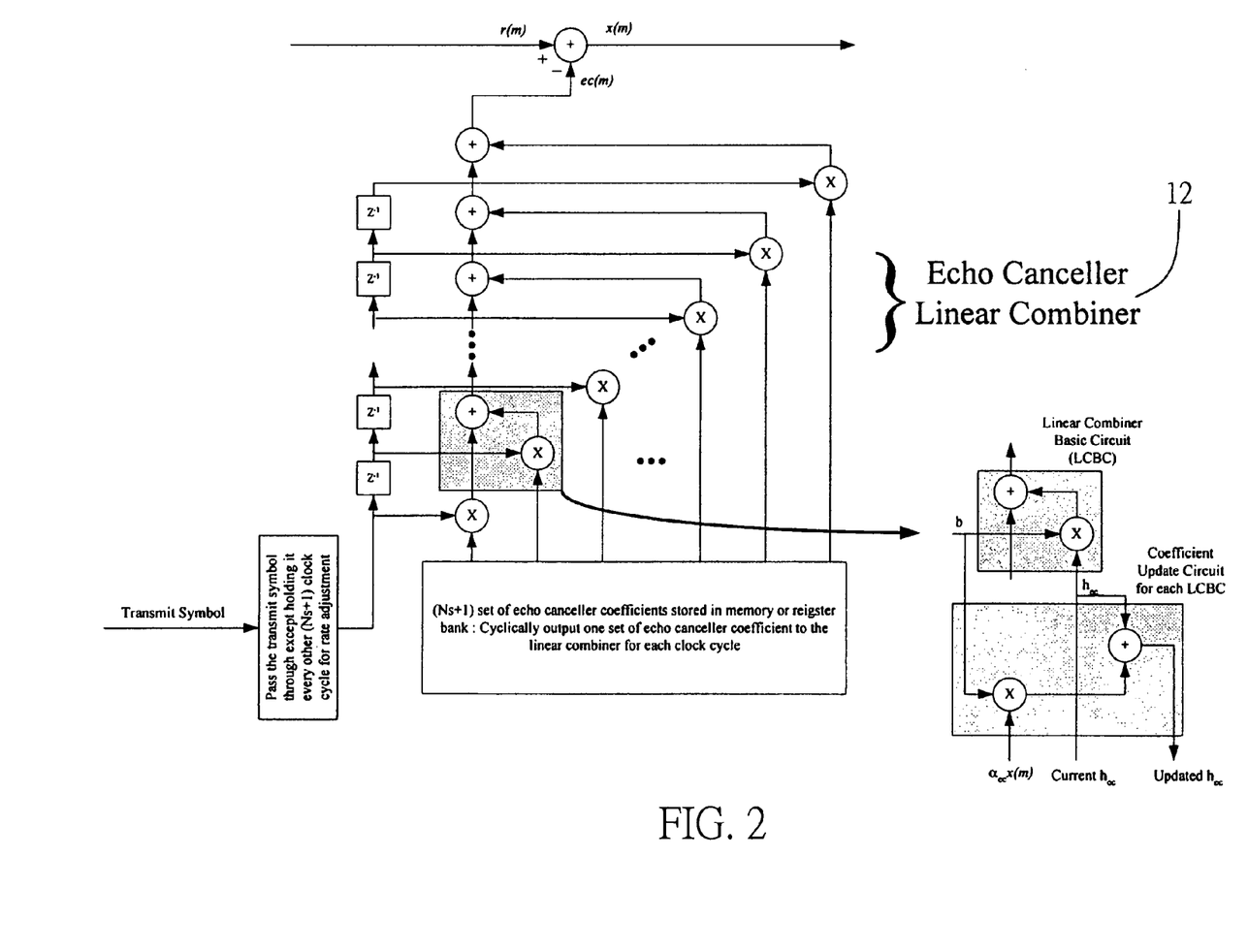
FIG. 2 shows a block diagram of a $(N_s+1)/N_s$ baud rate fractional-spaced echo canceller according to one embodiment of the present invention.

FIG. 2 shows a $(N_s+1)/N_s$ baud rate fractional-spaced echo canceller 12 structure in detail. During the echo canceller training mode, the transmit symbol is shifted in the echo canceller tap delay line. Since the transmit symbol is generated at the baud rate while the echo canceller 12 operates under the $(N_s+1)/N_s$ baud rate, this shifting is halted every $(N_s+1)$ clock cycle to match the two rates. There are $(N_s+1)$ sets of echo canceller weighing coefficients that are used to linearly combine with the data samples in the tap delay line in a rotating manner. Each set of the weighing coefficients corresponds to the echo path estimate for one of the ($N_s$+1) timing phases. The conventional LMS algorithm is used to adjust the weighing coefficients as shown in the lower right corner in FIG. 2. The update of the coefficient for each linear combiner basic circuit can be expressed as:

$$h_{ec}(m+1)=h_{ec}(m)+\alpha_{ec}x(m)b(m)$$

where $\alpha_{ec}$ is the step size. The signal x(m) given by:

$$x(m)=r(m)-ec(m)$$

which is the ADC output, r(m), subtracts the estimated echo from the echo canceller output, ec(m), and is fed to the digital resampler 13 for further processing. The fractional baud-rate echo canceller has the capability of removing out-of-band noise coupled with the echo and thus offers better noise rejection performance over a conventional baud-rate echo canceller.

Figure 11:
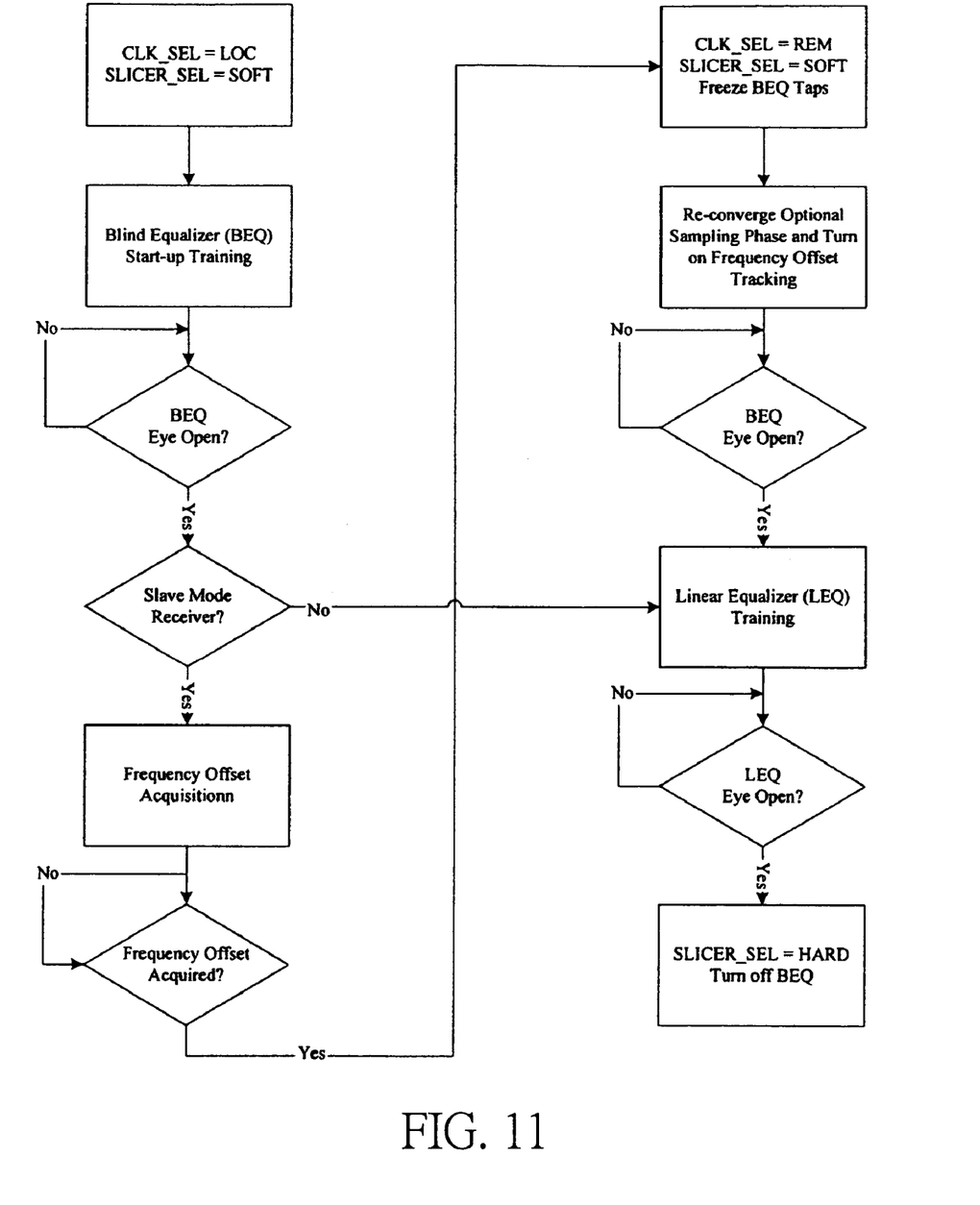
FIG. 11 shows a flow chart that specifies the detailed training sequence for the timing phase and equalizer coefficients for both the master and slave modes.

FIG. 11 shows the training state diagram for the equalizer and timing phase/frequency offset in both the master and slave modes. At the beginning of this training, the CLK_SEL is set to local and the SLICER_SEL is set to SOFT regardless the transceiver is in the master or slave mode. The process of blind start-up timing and equalization (BEQ) then starts. Echo has very little or no effect during this training since the echo is cancelled at the ADC output for the master mode transceiver and the transmitter is sending silence for the slave mode transceiver.

Figure 3:
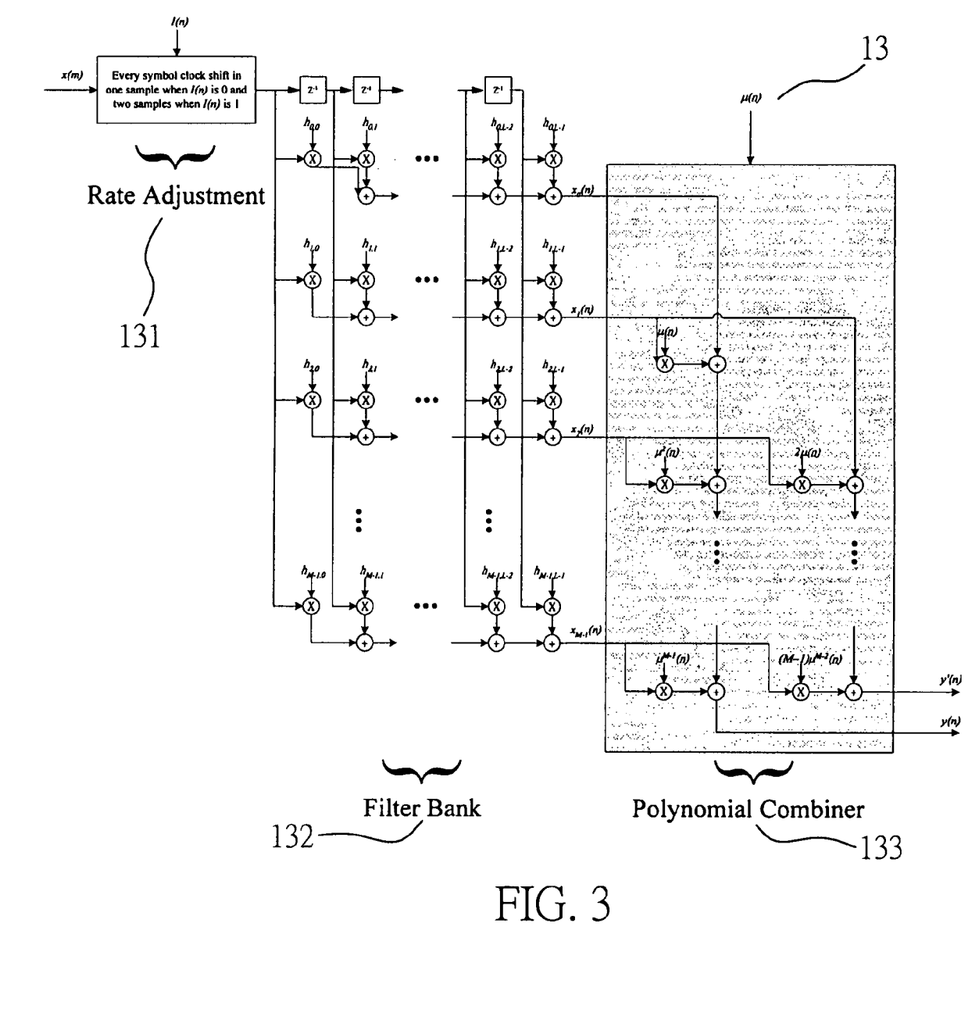
FIG. 3 shows an embodiment of a digital resampler according to the present invention.

In this BEQ training mode, the digital resampler 13, the decision feedback equalizer 171, the soft level slicer 172, the derivative channel estimator 19, the timing recovery PLL circuit 15 work jointly to converge to the "eye-open" condition during BEQ training stage. As shown in FIG. 3, the echo-free receiving signal x(m) is input to the digital resampler 13. The digital resampler 13 comprises a rate adjustment 131, a FIR filter bank 132 and a polynomial combiner 133. The simple rate adjustment circuit 131 is used to either shift in one or two samples of x(m) into the tap delay line of the filter bank 132. The 1-bit index I(n) generated by the timing recovery PLL circuit 15 is used to indicate this shift where I(n)=0 corresponds to shifting in one sample and I(n)=1 corresponds to shifting in two samples. Note that all of the circuits before this rate adjustment circuit 131 are operated under ($N_s$+1)/$N_s$ baud rate and after this rate adjustment circuit 131 are operated under baud rate. The FIR filter bank 132 is in the form of polynomial structure, as previously disclosed by Farrow, C. W. in a paper titled "A Continuously Variable Digital Delay Element" of IEEE Int. Symp. Circuits Systems in 1988, in which the corresponding derivative sample with the same timing phase can be computed simultaneously with very little additional circuit as shown in FIG. 3. Let $x_b(n)$ be a L×1 vector whose i-th element corresponds to the i-th element in the tap delay line of the filter bank 132, and the L outputs of the filter bank 32 can be expressed as:

$$x_i(n)=h_i^T x_b(n), i=0,1,KL-1$$

where $$h_i = \begin{bmatrix} h_{i0} \\ h_{i1} \\ M \\ h_{i,L-1} \end{bmatrix}$$

is an L×1 vector containing the fixed weighing coefficients for the i-th filter in the filter bank 132 and the superscript T denotes the vector/matrix transpose operation. The polynomial combiner 133 takes the L outputs of the filter bank 132 and the phase location denoted by μ(n), generated from the timing recovery PLL circuit 15 at each baud rate clock, and computes the data sample and derivative sample as:

$$y(n) = \sum_{i=0}^{M-1} x_i(n)\mu^i(n)$$

$$y'(n) = \sum_{i=1}^{M-1} ix_i(n)\mu^{(i-1)}(n)$$

The data sample y(n) is then fed to the equalizer section and the derivative sample y'(n) to the derivative channel estimator 19.

Figure 4:
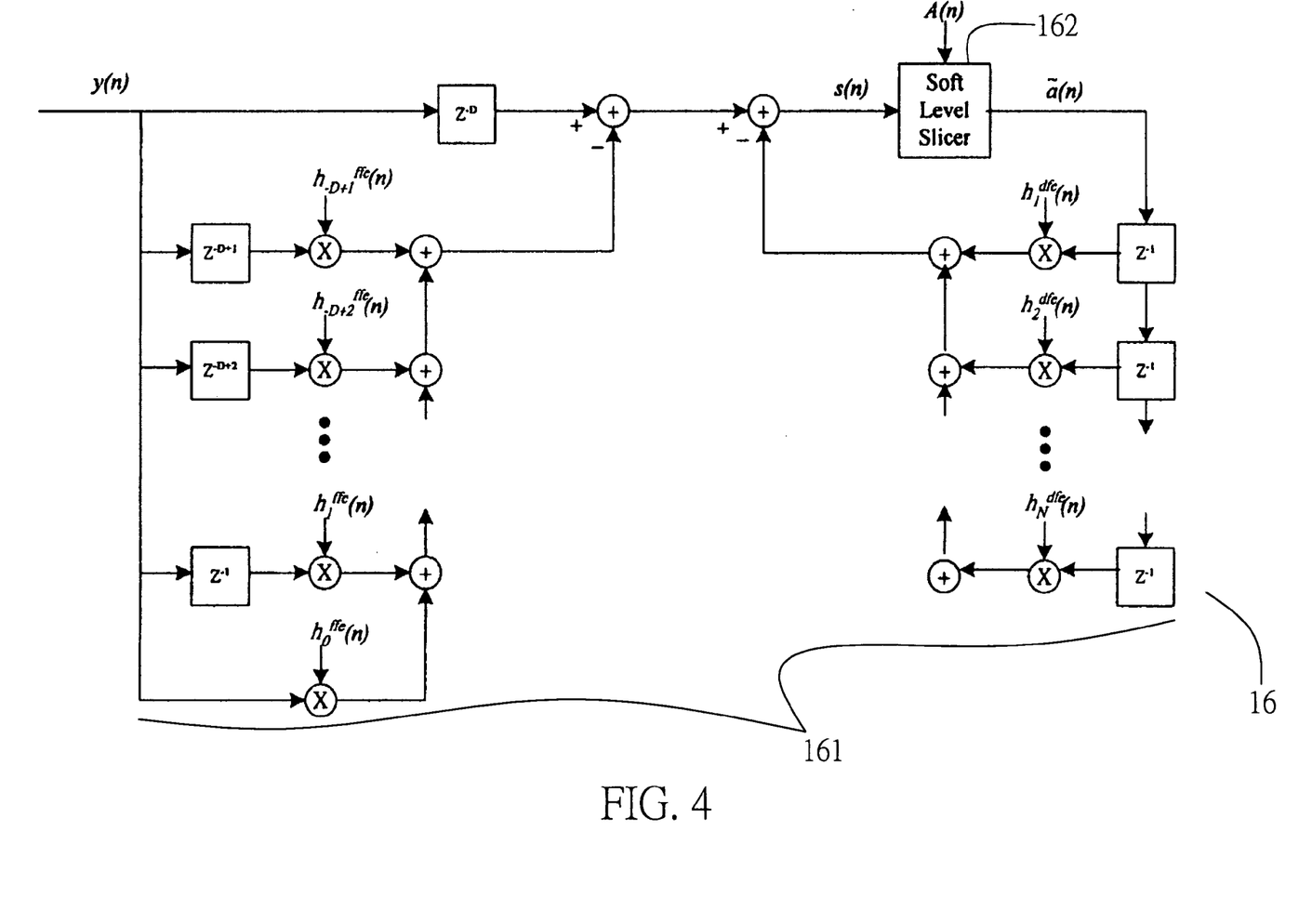
FIG. 4 shows a blind equalization (BEQ) branch according to one embodiment of the present invention.

As shown in FIG. 4, the decision feedback equalizer 161 consists of both feed forward and feedback taps. The main tap location is assumed at a delay of D and the corresponding weighing coefficient is fixed at unity. The input to the soft level slicer 162 is then given by:

$$s(n) = y(n-D) - \sum_{i=0}^{D-1} y(n-i)h_i^{ffe}(n) - \sum_{i=1}^{N} \tilde{a}(n-i)h_i^{dfe}(n)$$

The soft level slicer decision boundary is set to {0, ±A(n), ±2A(n), K}. The setting of A(n) can be easily perceived by assuming three-level PAM {−A(n), 0, A(n)} and the generalization to more levels is trivial. At the initial condition, A(n) is set to a nominal value such that the decision level equals to a hard level slicer. The number of slicer output points that fall in the range [−A(n) A(n)] is counted and the number of slicer output points that fall out of this range is also counted. The a prior information about the probability of the remote transmit symbols falling within and out of this range are used to determine whether A(n) should be increased or decreased so that the number of slicer output points fall within and out of this range closely match the probability distribution at the remote side. The increment or decrement of A(n) is controlled by a simple step size ΔA(n), which can be set to a small value to ensure stability. Note that the adjustment of this decision level is only used to decide the mapping of the slicer input to one of the remote transmit symbol levels. The slicer output ã(n) is still set at the nominal value for each level to ensure that a proper slicer error is computed. The slicer output ã(n) is then fed to the 2-to-1 multiplexer 18, and during this training stage SLICER_SEL=SOFT which implies a(n)=ã(n). The slicer error, computed as s(n)-a(n), is used to update the feed forward and feedback coefficients as follows:

$$h_i^{ffe}(n+1)=h_i^{ffe}(n)+\alpha_{ffe}y(n-i)[s(n)-a(n)], i=0,1,KD-1$$

$$h_i^{dfe}(n+1)=h_i^{dfe}(n)+\alpha_{dfe}a(n-i)[s(n)-a(n)], i=1,2,KN$$

where $\alpha_{ffe}$ and $\alpha_{dfe}$ are the step sizes.

Figure 7:
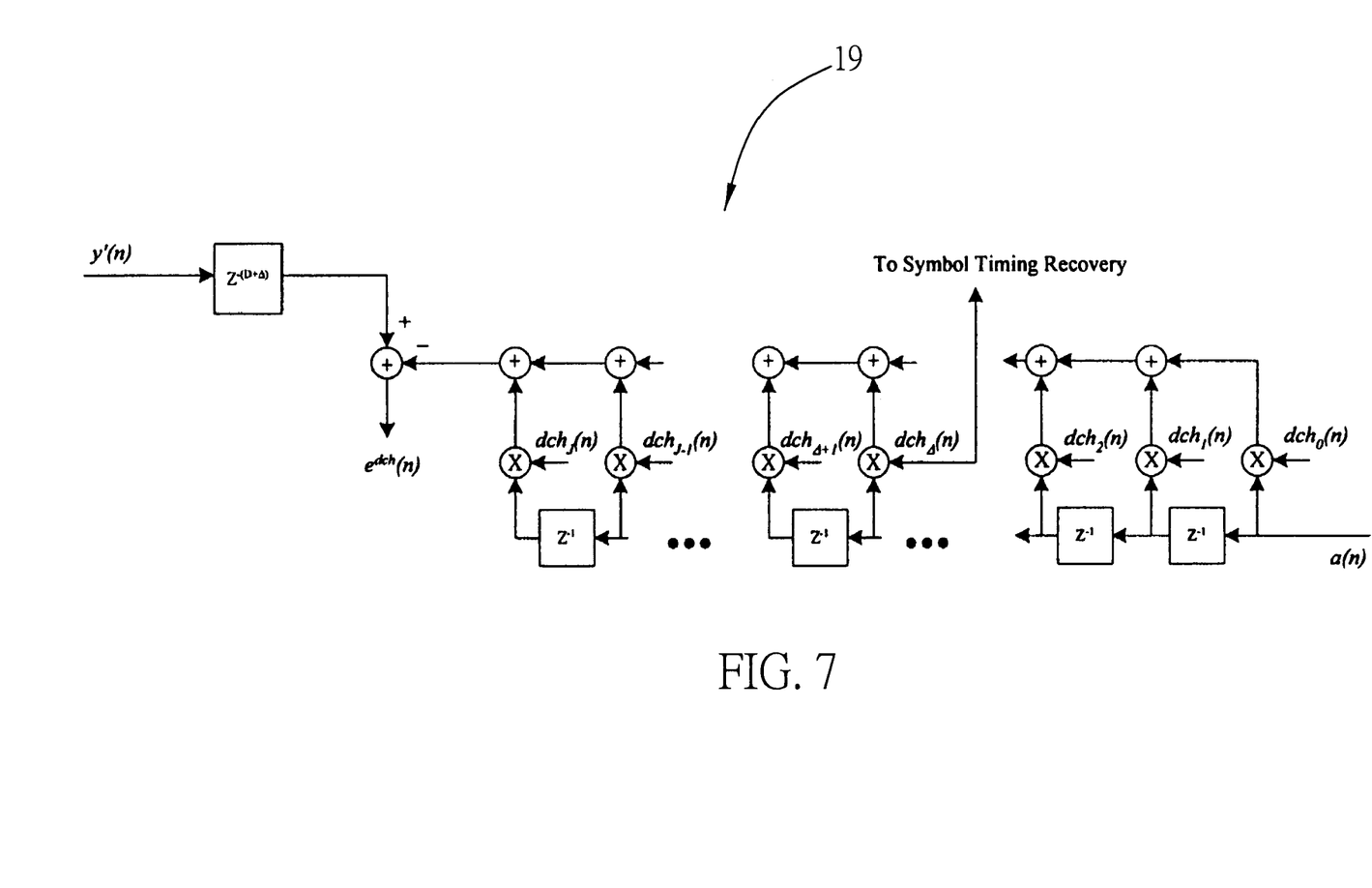
FIG. 7 shows a derivative channel estimator according to one embodiment of the present invention.
Figure 8:
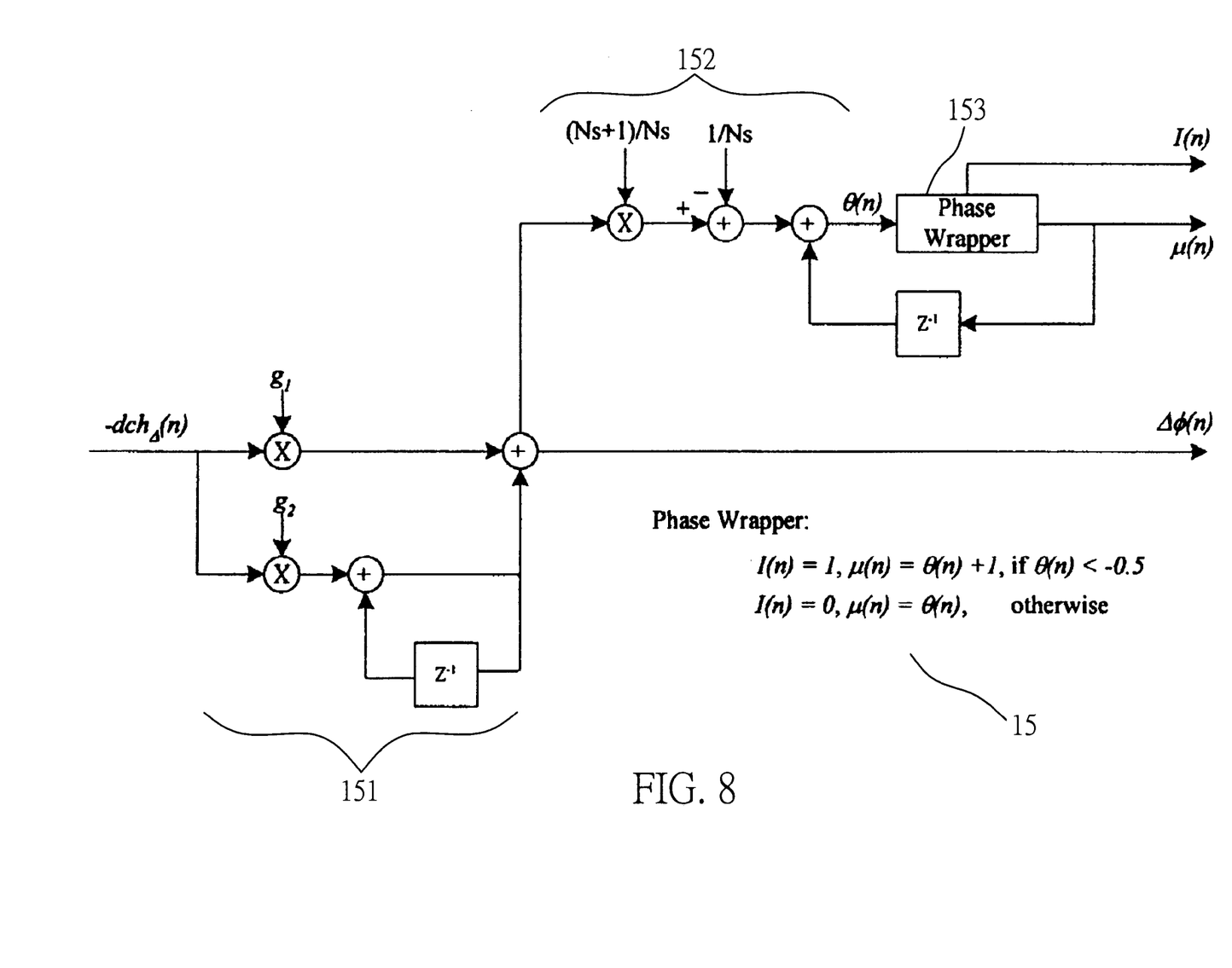
FIG. 8 shows a timing recovery PLL circuit according to one embodiment of the present invention.

The slicer output a(n) is also used to estimate the channel derivative as shown in FIG. 7 where the linear combination of the slicer output sequence is adaptively adjusted in the derivative channel estimator 19 to approximate the derivative sample y'(n). The approximation is achieved via Least-Mean Square minimization in which the weighing coefficients are updated as:

$$dch_i(n+1)=dch_i(n)+\alpha_{dch}a(n-i)e^{dch}(n), i=0,1,KJ$$

where $\alpha_{dch}$ is the step size and $$e^{dch}(n) = y'(n) - \sum_{i=0}^{J} dch_i(n)a(n-i)$$

is the instantaneous estimation error at time n. The resulting weighing coefficients are the derivative channel response tap estimates and the negative of the estimated derivative at the main cursor location, $-dch_A(n)$, is used as the timing error to drive the timing recovery PLL circuit 15 as shown in FIG. 8. Note that A is an integer corresponding to the desirable number of pre-cursors in the derivative channel estimator 19. The optimal timing phase is obtained when $dch_A(n)$ is driven to zero, a condition implying that the main cursor is sampled at the peak for the corresponding channel response and consequently the signal-to-noise ratio is maximized.

As shown in FIG. 8, the timing recovery PLL circuit 15 comprises a second order loop filter 151, a phase integrator 152 and a phase wrapper 153 to produce the phase estimate expressed in terms of I(n) and µ(n). The second order loop filter 151 serves to filter out the timing error jitter before the integrator 152 for smoother timing phase estimate. The conversion of the baud rate sample phase to the $(N_s+1)/N_s$ baud rate phase is effectively performed by use of a correction factor that consists of scaling the phase error, $\Delta\phi(n)$, by $(N_s+1)/N_s$ and subtracting it by $1/N_s$ as shown in the FIG. 8. The simple phase wrapper 153 is used to perform the phase wrapping at the output of the integrator 152 and has the following function:

$$I(n)=1, \mu(n)=\theta(n)+1, \text{if } \theta(n)<-0.5$$

$$I(i)=0, \mu(n)=\theta(n), \text{otherwise}$$

Figure 9:
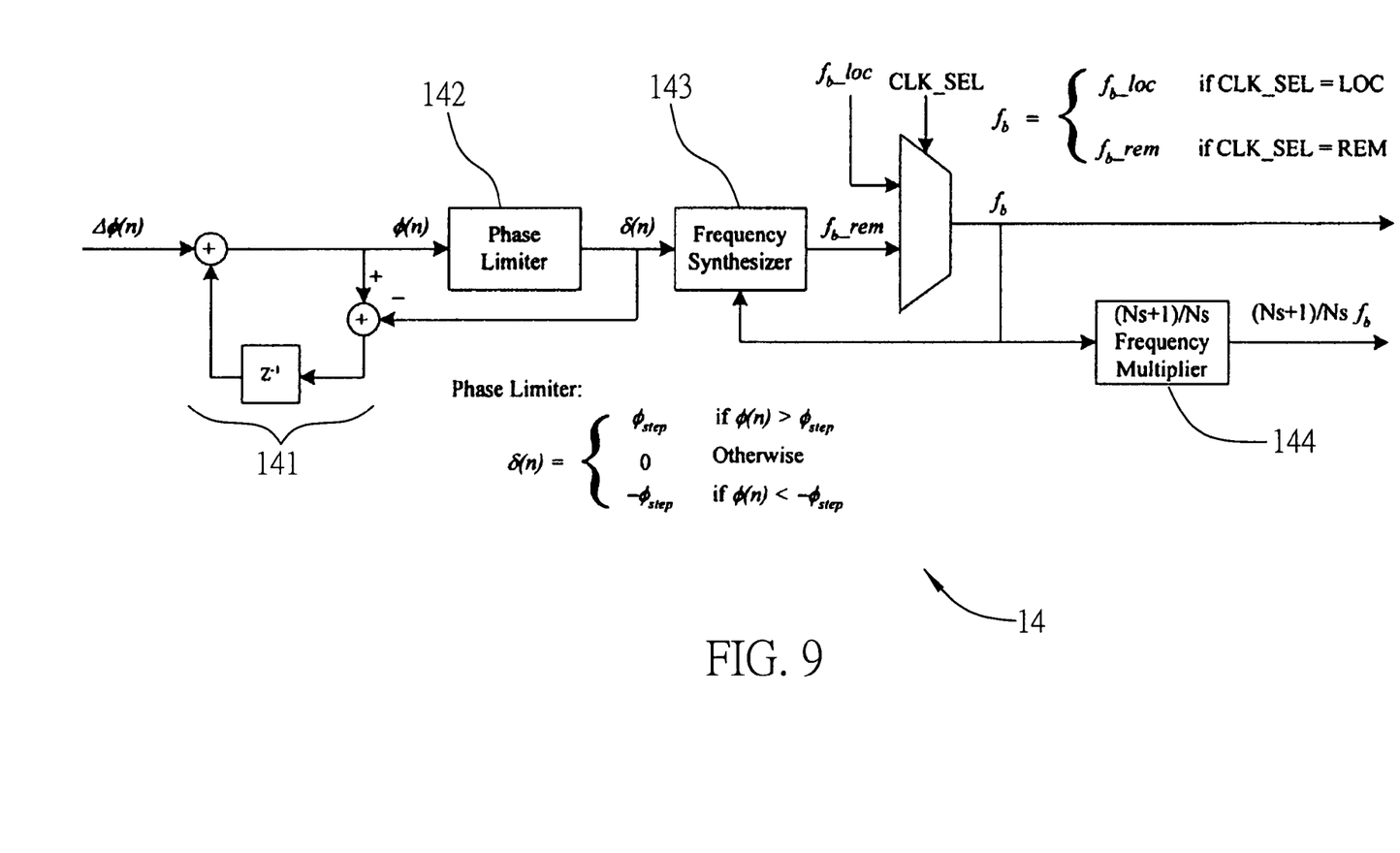
FIG. 9 shows a frequency synthesizer block diagram that generates both the baud rate and $(N_s+1)/N_s$ baud rate to drive a DAC and an ADC, respectively.

Note that both θ(n) and µ(n) are constrained to be in the range of −0.5 to 0.5 after this phase wrapper 153. The resulting 1-bit index I(n) and the normalized phase value µ(n) are fed back to the digital resampler 13 to adjust for the newly estimated timing phase, which closes the "blind" equalization and timing recovery loop. The unscaled phase error, $\Delta\phi(n)$, is also fed to the local/remote clock generator 14 as shown in FIG. 9. Note that during this blind start-up stage the CLK_SEL is set to LOC and thus the $(N_s+1)/N_s$ baud rate clock that is used to drive the ADC is synchronized to the local baud rate clock, fb_loc, regardless whether the transceiver is in master or slave mode.

After the blind equalization and timing converge to the "eye-open" condition, i.e., the slicer essentially reproduces a delay version of the remote transmitting symbol sequence, the master mode receiver can directly switch to train the linear equalizer and error feedback equalizer coefficients. For the slave mode receiver, it is necessary to continue to train the timing loop so that the frequency offset (the baud rate discrepancy between the remote transmitter and the local receiver that may have up to ±100 PPM for the Gigabit Ethernet) can be learned within an acceptable level. Effectively, this frequency offset can be observed from the delay unit in the lower branch of the second-order loop filter 151 in the timing recovery PLL circuit 15 as shown in FIG. 8. Once this frequency offset is acquired, the CLK_SEL is changed to REM so that the ADC clock frequency is switched to synchronize with the remote transmitter clock frequency. As shown in FIG. 9, the unscaled phase error, $\Delta\phi(n)$, is used to drive an integrator 141, a phase limiter 142 and a frequency synthesizer 143 in the local/remote clock generator circuit 14 to synthesize the remote baud rate clock, fb_rem. A simple frequency multiplier 144 is also used to generate the corresponding $(N_s+1)/N_s \cdot f_b$ fractional baud rate clock. Once the frequency offset is acquired, this clock virtually converges to synchronize with the remote transmitter baud rate. Since the frequency offset is readily corrected by this local/remote clock generator circuit 14, the delay unit in the lower branch of the second order loop filter 151 in the timing recovery PLL circuit 15 should be set to 0 to avoid "double compensation". During this clock switching operation for the slave mode, it is more stable to freeze the decision feedback equalizer coefficients to avoid any transient effect that causes the equalizer to diverge. It is also necessary to re-converge the timing phase location since the synthesized fb_rem only tracks the frequency of the remote clock but not the optimal phase location. As a direct result of not tracking the phase in the analog domain, no complex analog phase selection circuit is required and the task of phase adjustment is performed in the digital domain by use of the digital resampler even after the ADC clock has synchronized with the remote clock in frequency.

Figure 5:
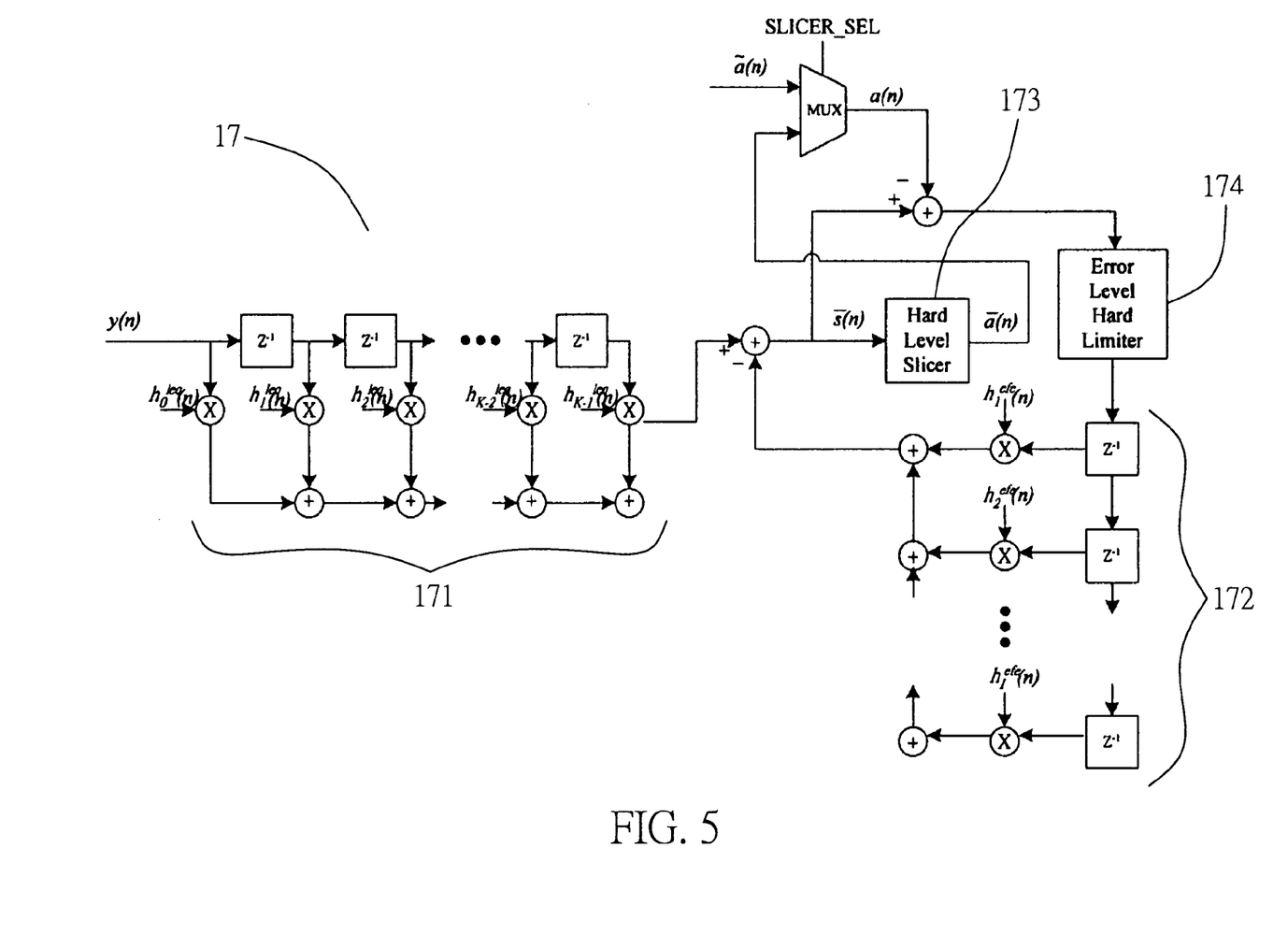
FIG. 5 shows a linear equalizer (LEQ) branch according to one embodiment of the present invention.
Figure 6:
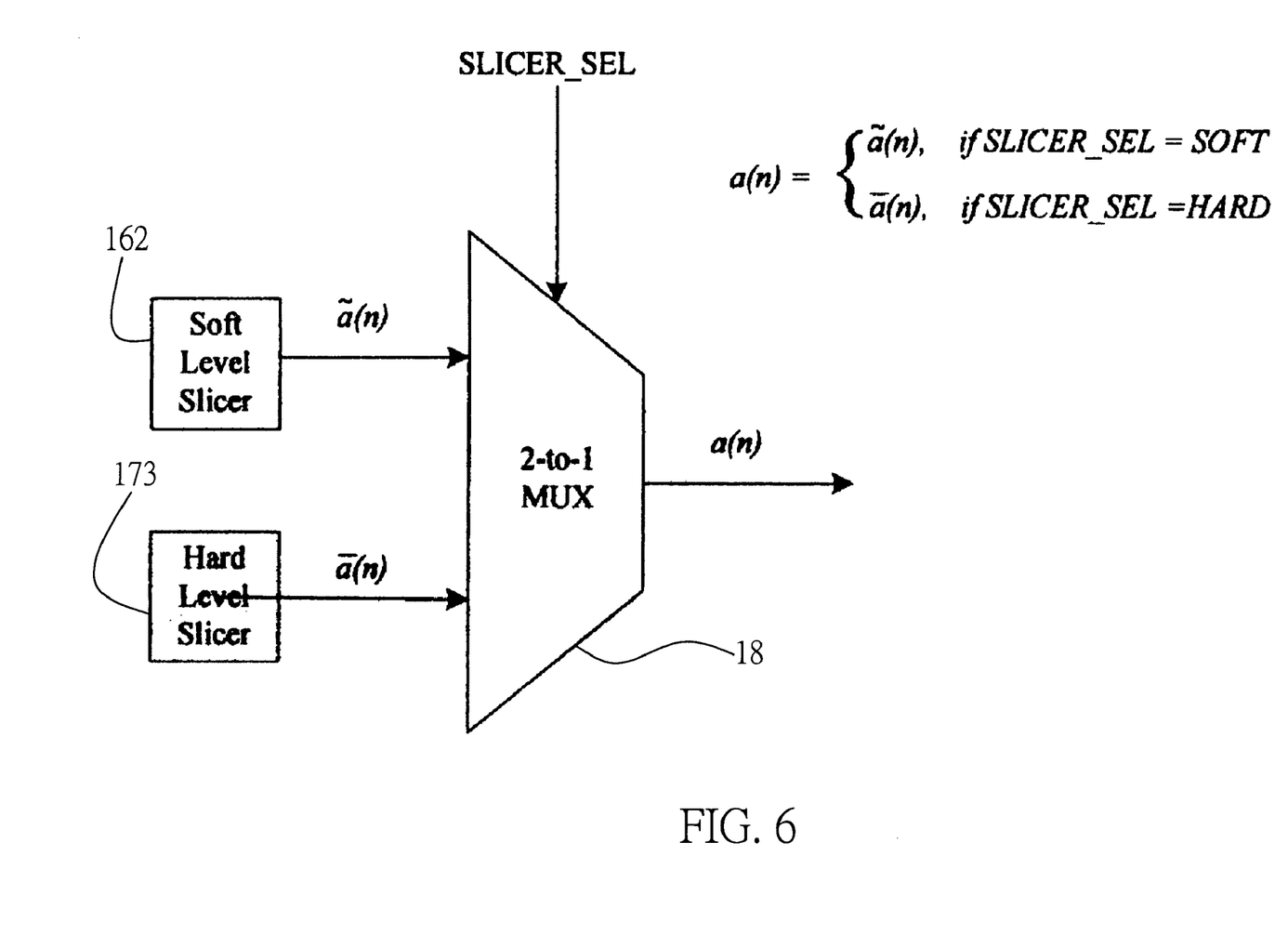
FIG. 6 shows a 2-to-1 multiplexer that selects either the soft slicer output or the hard slicer output as the receiver symbol decision.

Referring back to FIG. 11, after the timing phase is re-converged to the optimal setting, the "eye-open" condition is achieved again. The slave mode receiver can now switch to train the linear equalizer and error feedback equalizer as in the master mode. At the beginning of this training, the SLICER_SEL is set to SOFT so that the decision from the BEQ branch 16 is used to compute the slicer error to update the linear and error feedback equalizers 171 and 172. It is only when the LEQ branch 17 converges to the "eye-open" condition should the SLICER_SEL be set to HARD to turn on the decision-directed mode. As shown in FIG. 5, the update of the linear equalizer 171 and error feedback equalizer 172 are given by:

$$h_i^{leq}(n+1)=h_i^{leq}(n)+\alpha_{leq}y(n-i)[\bar{s}(n)-a(n)], i=0,1,KK-1$$

$$h_i^{efe}(n+1)=h_i^{efe}(n)+\alpha_{ffe}e^{efe}(n-i)[\bar{s}(n)-a(n)], i=1,2,K,I$$

where $\alpha_{leq}$ and $\alpha_{ffe}$ are the step sizes and $$e^{efe}(n-i)=\bar{s}(n-i)-a(n-i), i=1,2,\ldots,I$$

are the delayed version of the slicer errors. The slicer input is a combination of the linear equalizer output and the error feedback equalizer output given by:

$$\bar{s}(n) = \sum_{i=0}^{K-1} h_i^{leq}(n)y(n-i) - \sum_{i=1}^{I} h_i^{efe}(n)e^{efe}(n-i)$$

The receiver will enter the data mode after the LEQ is converged. The hard limiter 174 can also be employed to limit the slicer error before feeding to the error feedback equalizer 172.

Figure 12:
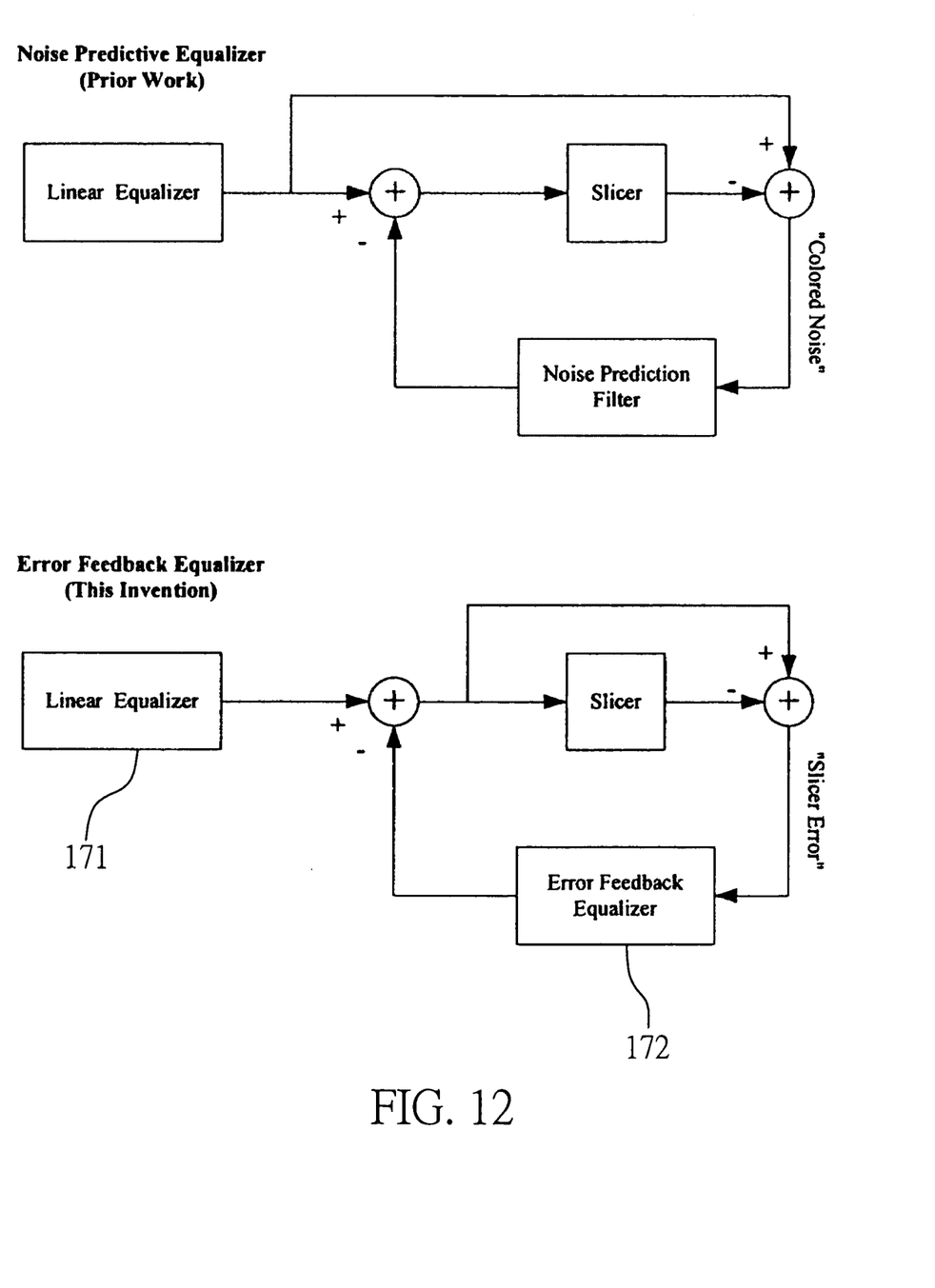
FIG. 12 shows a difference between the "error" signal definitions for the conventional noise-predictive approach and for the error feedback equalizer (EFE) approach of the present invention.

It should be noted that the error feedback equalizer (EFE) 172 is different than the predictive-noise approach described in the U.S. patent (U.S. Pat. No. 5,784,415) and the publication authored by Eybuoglu, M. V. As shown in FIG. 12, for the conventional noise-predictive approach, the "error signal" is generated as the difference between the slicer output and the linear equalizer output. A linear prediction filter is then used to predict this error and used to cancel the "colored" noise at the linear equalizer output. For the EFE approach presented here, the "error signal" is generated as the difference between the slicer output and the slicer input. Since the slicer input contains both the linear equalizer 171 output and the EFE 172 output, the "error signal" is not the "colored" noise as in the linear predictive approach. At the convergence state, the "error signal" defined here is less noisier and it represents the combination of all uncancelled noise in the slicer input. The EFE 172 thus plays the role of adaptively tracking these noise components and cancel them in a time-varying manner.

The present invention has been described with specific embodiments above. However, it should be apparent to those skilled in the art that the above description is only illustrative of specific embodiments and examples of the present invention. The present invention should therefore cover various modifications and variations made to the herein-described architecture and operations of the present invention, provided they fall within the scope of the present invention as defined in the following appended claims.

What is claimed is:

1. A receiver applicable in a full-duplex multi-level (Pulse Amplitude Modulation) PAM transceiver for receiving and demodulating an analog signal transmitted at a baud rate by a remote transmitter, comprising:
   an Analog-to-Digital Converter (ADC) for converting the received analog signal to a digital sample at a fractional baud rate;
   a digital resampler for converting the fractional baud rate sample with an arbitrary timing phase into a baud rate data sample and a baud rate derivative sample, both at an optimal timing phase;
   an equalization unit receiving the baud rate data sample so as to adaptively Perform channel equalization at baud rate; and
   a timing recovery feedback unit for locating the optimal timing phase by receiving the baud rate derivative sample and an output from the equalization unit and outputting an estimate of the timing phase back to the digital resampler.

2. The receiver as claimed in claim 1, wherein the fractional baud rate is calculated by dividing (Ns+1) by Ns and times the baud rate, where Ns is an integer greater than or equal to one.

3. The receiver as claimed in claim 2, further comprising a fractional-spaced echo canceller being driven by transmit symbols from a local transmitter in the transceiver operating at a baud rate sampling clock.

4. The receiver as claimed in claim 3, wherein the fractional-spaced echo canceller comprises a tap delay line for shifting the transmit symbols, the shifting being halted every (Ns+1) clock cycles.

5. The receiver as claimed in claim 1, wherein the digital resampler comprises a rate adjustment circuit, a filter bank and a polynomial combiner, the rate adjustment circuit is used to couple the rate between $(N_s+1)/N_s$ baud rate and the baud rate, both the data sample and the derivative sample are generated from the polynomial combiner based on the same output from the filter bank.

6. The receiver as claimed in claim 5, wherein the rate adjustment circuit shifts inputted signal sample into a tap delay line of the filter bank according to a 1-bit index from the timing recovery unit, and wherein the polynomial combiner takes the output of the filter bank and a phase location generated from the timing recover unit at each baud rate clock and computes the baud rate data sample and baud rate derivative sample.

7. The receiver as claimed in claims 1 or 3, wherein the equalization unit comprises a decision feedback equalizer with the main cursor tap fixed at unity and a soft level slicer that is control by an adaptive level, the update of the adaptive level is based on matching the distribution of the slicer output points with the a priori information about this distribution at the remote transmitter side.

8. The receiver as claimed in claim 1, wherein the equalization unit comprises:
   a blind start-up equalization (BEQ) circuit for performing channel equalization at a start-up stage of the receiver; and
   a linear equalization (LEQ) circuit for performing channel equalization at a steady state of the receiver.

9. The receiver as claimed in claim 8, wherein the BEQ circuit comprises a decision feedback equalizer and a soft level slicer.

10. The receiver as claimed in claim 8, wherein the LEQ circuit comprises a linear equalizer and a hard level slicer.

11. The receiver as claimed in claim 10, wherein the LEQ circuit further comprises an error feedback equalizer for adaptively compensating noise enhancement generated by the linear equalizer, wherein the error generated from the error feedback equalizer is the difference between an input and output of the hard level slicer.

12. The receiver as claimed in claim 10, wherein the LEQ circuit further comprises a hard limiter for reducing error propagation by limiting the error level of the hard level slicer.

13. The receiver as claimed in claim 1, wherein the timing recovery feedback unit comprises:
   a derivative channel estimator for generating a timing phase error by using the output of the equalization unit to approximate the baud rate derivative sample received from the digital resampler; and
   a timing recovery phase-locked loop (PLL) circuit receiving the timing phase error and generating an estimate of the optimum timing phase location to be fed to the digital resampler.

14. The receiver as claimed in claim 13, wherein a zero timing phase error is defined statistically when the first order derivative of the channel response at a main cursor location in the derivative channel estimator is driven to zero.

15. The receiver as claimed in claim 13, wherein the timing recovery PLL circuit includes a second-order loop filter and an integrator, the timing phase error is adjusted by a simple scaling and subtraction before feeding to the integrator to produce the phase at the fractional baud rate domain that can be directly fed to the digital resampler, and the output of the phase is also effectively represented by a 1-bit index.

* * * * *